US010803603B2

(12) United States Patent
Lee et al.

(10) Patent No.: US 10,803,603 B2
(45) Date of Patent: Oct. 13, 2020

(54) MOVING OBJECT DETECTION SYSTEM AND METHOD (71) Applicant: NATIONAL APPLIED RESEARCH LABORATORIES, Taipei (TW)

(72) Inventors: Pei-Jun Lee, Nantou County (TW); Zheng-Kai Chiu, Nantou County (TW); Kuang-Zhe Liu, Nantou County (TW); Chia-Ray Chen, Hsinchu (TW); Hsin-Chia Lin, Hsinchu (TW)

(73) Assignee: NATIONAL APPLIED RESEARCH LABORATORIES (TW)

( * ) Notice: Subject to any disclaimer, the term of this patent is extended or adjusted under 35 U.S.C. 154(b) by 70 days.

(21) Appl. No.: 16/215,531

(22) Filed: Dec. 10, 2018

(65) Prior Publication Data
US 2020/0160539 A1 May 21, 2020

(30) Foreign Application Priority Data

Nov. 16, 2018 (TW) .............................. 107140761 A (51) Int. Cl.
G06T 7/246 (2017.01)
G06T 7/194 (2017.01)
G06K 9/00 (2006.01)
G06K 9/46 (2006.01)

(52) U.S. Cl.
CPC .......... *G06T 7/248* (2017.01); *G06K 9/00771* (2013.01); *G06K 9/46* (2013.01); *G06T 7/194* (2017.01); *G06T 2207/30232* (2013.01)

(58) Field of Classification Search
CPC ....... G06T 7/194; G06K 9/00771; G06K 9/46
See application file for complete search history.

(56) References Cited

U.S. PATENT DOCUMENTS

| 2016/0283798 A1* | 9/2016 | Goldner | ............. G06K 9/00778 |
| 2017/0186169 A1* | 6/2017 | Viswanath | ........... G06K 9/4604 |
| 2018/0211104 A1* | 7/2018 | Zhao | ..................... G06K 9/3233 |
| 2019/0162508 A1* | 5/2019 | Li | ............................. F41G 3/06 |

* cited by examiner

*Primary Examiner* — Edward Park (57) ABSTRACT

Disclosures of the present invention describe a moving object detection system and method, wherein a pre-processer module, a feature extraction module, an image optical flow estimation module, a feature points grouping module, and a moving object determination module are provided in a controlling and processing module of the system by a form of library, variables, or operands. Moreover, a feature difference calculation unit, a matrix establishing unit and a corner feature point acquiring unit are provided in the feature extraction module, and that is helpful for enhancing computing speed of the controlling and processing device in verifying corner feature points from image frames. Therefore, after the corner feature points are applied with a cluster labeling process, the moving object determination module can achieve motion detection of at least one object locating in a monitoring area by determining whether corner feature point groups move or not.

11 Claims, 10 Drawing Sheets

MOVING OBJECT DETECTION SYSTEM AND METHOD

BACKGROUND OF THE INVENTION

1. Field of the Invention

The present invention relates to the technology field of image processing, and more particularly to a moving object detection system and method capable of being implemented into unmanned aerial vehicle (UAV), satellite, robotics system for space exploration, and surveillance system.

2. Description of the Prior Art

In traditional surveillance system, occurrences of abnormal events can be detected by analyzing trajectories and behaviors of the objects moving in a monitoring area. Therefore, moving object detection technology has been known to play an important role in an automatic surveillance system. For instance, U.S. Pat. No. 6,867,799 discloses an apparatus for object surveillance with a movable camera. The disclosed object surveillance apparatus comprises: a moving object detection unit, a selector unit, a translator unit, a coordinating future position unit, and a movement coordinator. From the disclosures of U.S. Pat. No. 6,867, 799, it is understood that, the object surveillance apparatus is configured for holding an object of interest in a field of view of a movable video camera, wherein the object of interest is selected from a plurality of moving objects detected in the field of view. Moreover, an indication of the selected moving object is received and is used to predict a future position thereof, such that movement commands for the camera are created based on the future position of the moving object, so as to make the moving object be remained in the field of view of the camera.

Figure 1:
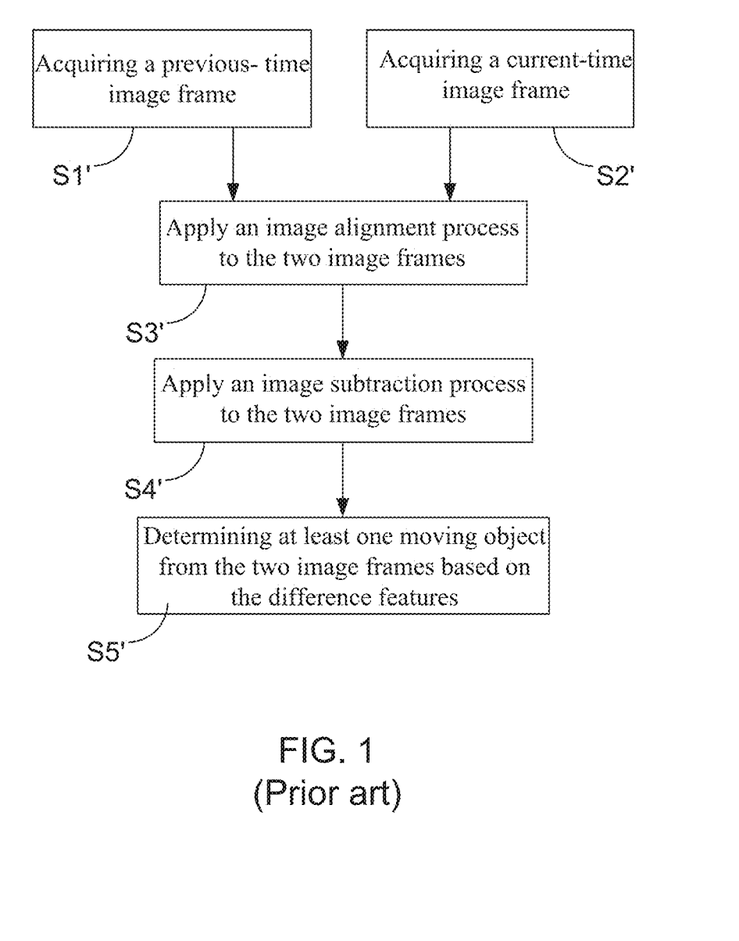
FIG. 1 shows a flowchart of a conventional moving object detection method using image alignment technique.

In the aforementioned and other moving object detection methods, image alignment and visual optical flow tracing are two of the most common moving object detection techniques for movable platforms. FIG. 1 shows a flowchart of a conventional moving object detection method using image alignment technique. In the moving object detection method shown in FIG. 1, steps S1' and S2' are firstly executed for respectively acquiring a previous-time image frame and a current-time image frame. The said previous-time image frame and the said current-time image frame can be respectively an image frame captured at time point "t−1" and an image frame captured at time point "t", and can also be respectively an image frame captured at time point "t" and an image frame captured at time point "t+1". The method flow subsequently proceeds to step S3', so as to apply an image alignment process to the two image frames. Subsequently, in step S4', the two image frames are applied with an image subtraction process so as to find out difference features between the two image frames. Consequently, the method flow is proceeded to step S5', such that a controller or a microprocessor is able to achieve the determination of at least one moving object from the two image frames based on the difference features. Computer engineers skilled in conventional moving object detection method using image alignment technique should know that, the moving object detection method using image alignment technique has advantages of merely using single camera to capture images and high image processing speed. However, it needs to particularly note that, the image alignment technology used for finding out the difference features from the two image frames is a contour-based approach. In general, the region-based approach is more accurate and noise-resistant than the contour-based approach for image alignment under the same illumination conditions.

Figure 2:
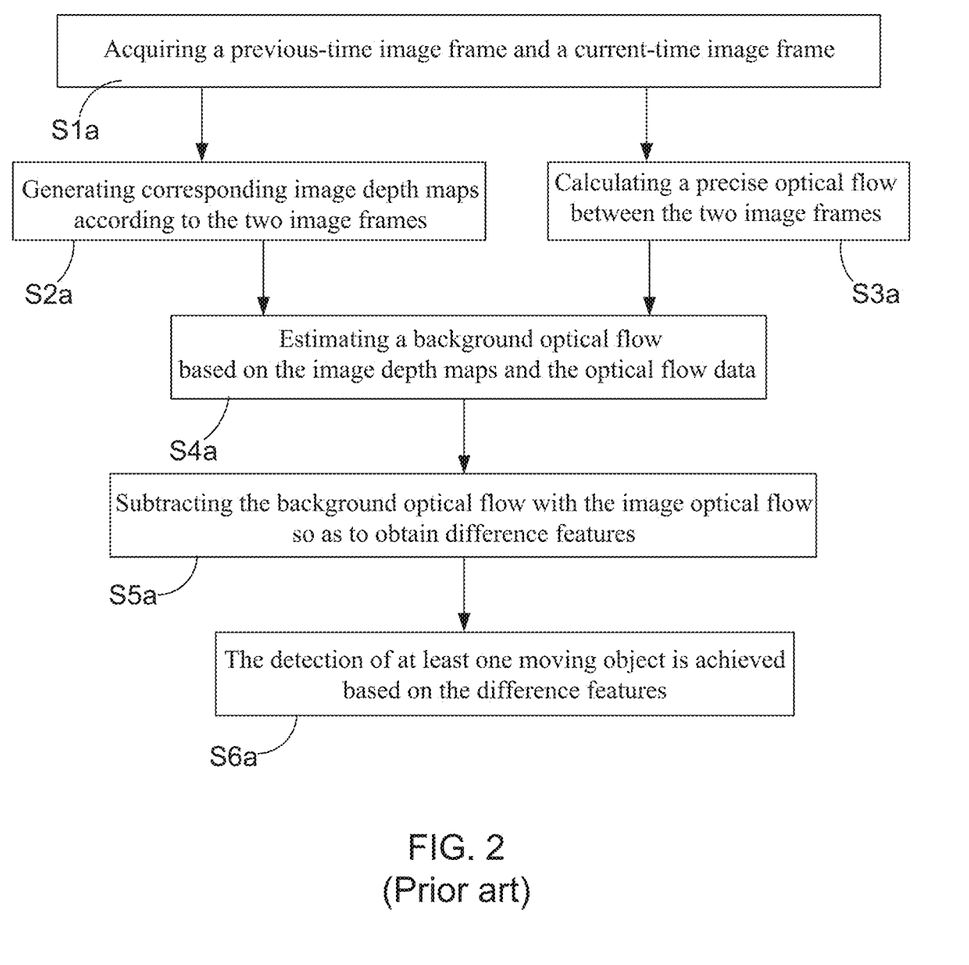
FIG. 2 shows a flowchart of another conventional moving object detection method using visual optical flow tracing technique.

On the other hand, FIG. 2 illustrates a flowchart of another conventional moving object detection method using visual optical flow tracing technique. In the moving object detection method shown in FIG. 2, step S1a is firstly executed for acquiring a previous-time image frame and a current-time image frame. Next, step S2a is executed for generating corresponding image depth maps according to the two image frames, and step S3a is simultaneously executed for calculating a precise optical flow between the two image frames. Next, in step 4a, a background optical flow trajectory is estimated based on the image depth maps and the optical flow data. As a result, by subtracting the background optical flow with the image optical flow (step S5a), difference features are therefore obtained for use in the detection of at least one moving object (step S6a). Computer engineers skilled in conventional moving object detection method using visual optical flow tracing technique should know that, the moving object detection method using visual optical flow tracing technique has advantages of being able to precisely track the moving object and obviously enhancing the accuracy of the moving object determination. However, it is a pity that, there are at least two cameras used in the visual optical flow tracing technology for carrying out the subtraction process of the background optical flow and the image optical flow. Such specific way does not only lead the whole apparatus cost to be more expensive, but also causes the image processing speed become slower.

From above descriptions, it is known that both the image alignment technology and the optical flow tracing technology show drawbacks and shortcomings in their practical applications of moving object detection. In view of that, inventors of the present application have made great efforts to make inventive research thereon and eventually provided a moving object detection system and method.

SUMMARY OF THE INVENTION

The primary objective of the present invention is to provide a moving object detection system and method, wherein the moving object detection system mainly comprises an image capturing device and a controlling and processing module. Moreover, a pre-processer module, a feature extraction module, an image optical flow estimation module, a feature points grouping module, and a moving object determination module are provided in the controlling and processing module by a form of application program, library, variables, or operands. In the present invention, more particularly, a feature difference calculation unit, a matrix establishing unit and a corner feature point acquiring unit are further provided in the feature extraction module, and that is helpful for largely enhancing the computing speed of the controlling and processing device in verifying and choosing corner feature points from the image frames. Therefore, after the corner feature points are applied with a cluster labeling process, the moving object determination module can achieve motion detection of at least one object locating in a monitoring area by just determining whether corner feature point groups move or not.

In order to achieve the primary objective of the present invention, the inventor of the present invention provides an embodiment for the moving object detection system, comprising:

an image capturing device, being connected to a camera carrying device, and is used for applying an image capturing process to a monitoring area having at least one object; and a controlling and processing module, comprising:
- a pre-processer module, being configured for receiving a plurality of image frames with time consecutiveness from the image capturing device 11, so as to apply a background subtraction process to the plurality of image frames; wherein the plurality of image frames comprises a plurality of image frame pairs, and each of the plurality of image frame pairs consisting of a previous-time image frame and a current-time image frame;
- a feature extraction module, being coupled to the pre-processer module for applying a feature extraction process to the plurality of image frames after the background subtraction process is completed, so as to obtain a plurality of corner feature points from each of the plurality of image frames;
- an image optical flow estimation module, being coupled to the feature extraction module, and being configured for establishing a plurality of image pyramid pairs based on the plurality of image frame pairs after the feature extraction process is completed, so as to apply an optical flow calculation process to the plurality of corner feature points contained in each of the plurality of image pyramid pairs;
- a feature points grouping module, being coupled to the image optical flow estimation module, and being configured to apply a cluster labeling process to the plurality of corner feature points contained in each of the plurality of image pyramid pairs, so as to obtain a plurality of corner feature point groups; and
- a moving object determination module, being coupled to the feature points grouping module, and being configured to achieve a motion detection of the at least one object by determining whether the plurality of corner feature point groups move or not.

Moreover, for achieving the primary objective of the present invention, the inventor of the present invention also provides an embodiment for the moving object detection method, comprising following steps:

(1) providing an image capturing device for applying an image capturing process to a monitoring area having at least one object;

(2) providing a controlling and processing module comprising a pre-processer module, a feature extraction module, an image optical flow estimation module, a feature points grouping module, and a moving object determination module, so as to use the pre-processer module of the controlling and processing module to apply a background subtraction process to a plurality of image frames received from the image capturing device; wherein the plurality of image frames comprises a plurality of image frame pairs, and each of the plurality of image frame pairs consisting of a previous-time image frame and a current-time image frame;

(3) applying a feature extraction process, by the feature extraction module, to the plurality of image frames after the background subtraction process is completed, so as to obtain a plurality of corner feature points from each of the plurality of image frames;

(4) using the image optical flow estimation module to establish a plurality of image pyramid pairs based on the plurality of image frame pairs after the feature extraction process is completed; wherein each of the plurality of image pyramid pairs comprises a previous-time image pyramid and a current-time image pyramid;

(5) applying an optical flow calculation process to the plurality of corner feature points contained in each of the plurality of image pyramid pairs by the image optical flow estimation module;

(6) applying a cluster labeling process, by the feature points grouping module, to the plurality of corner feature points contained in each of the plurality of image pyramid pairs, so as to obtain a plurality of corner feature point groups; and (7) the moving object determination module being configured to achieve a motion detection of the at least one object by determining whether the plurality of corner feature point groups move or not.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE PREFERRED EMBODIMENTS

To more clearly describe a moving object detection system and method according to the present invention, embodiments of the present invention will be described in detail with reference to the attached drawings hereinafter.

Figure 3:
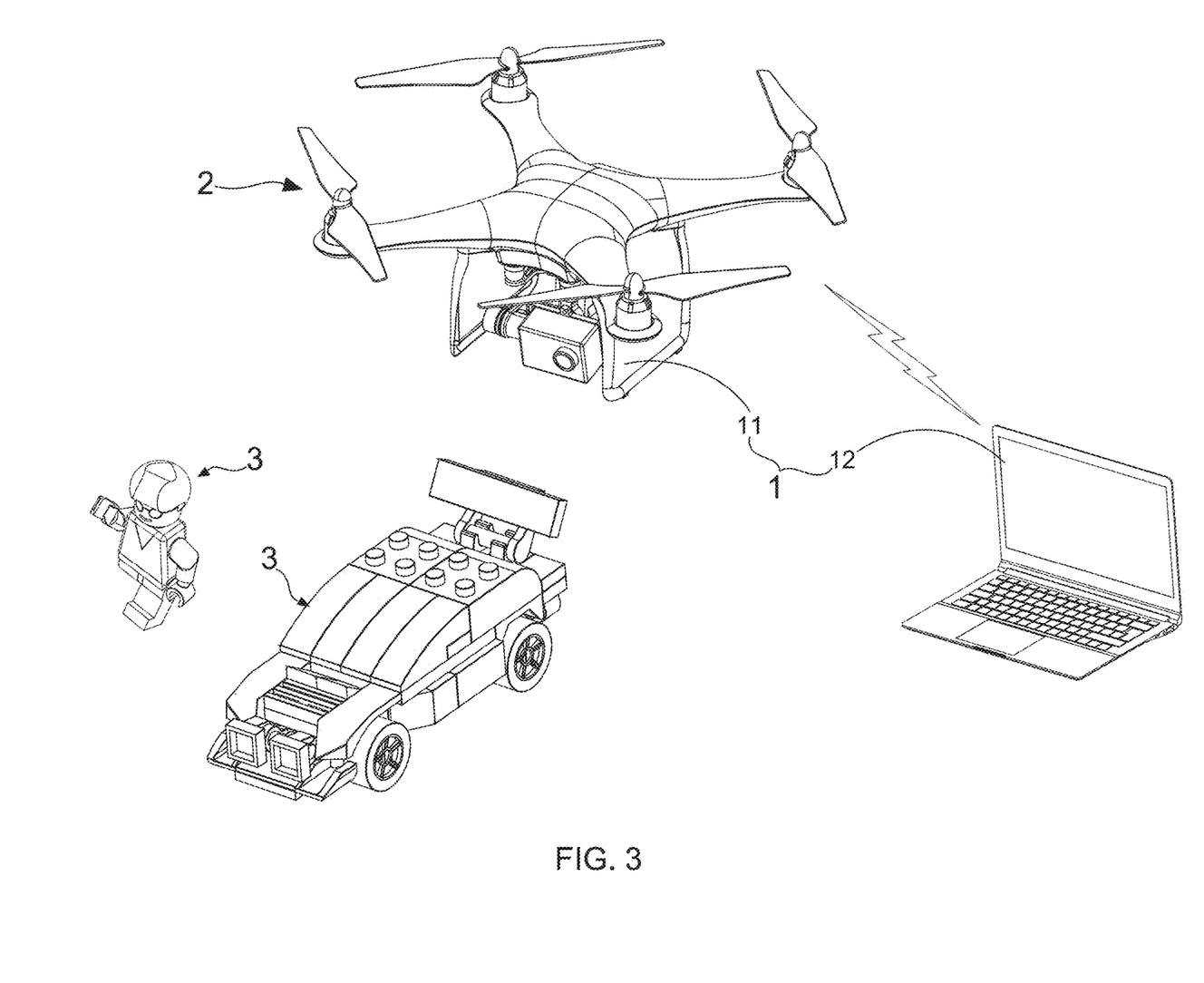
FIG. 3 shows a framework diagram of a moving object detection system according to the present invention.
Figure 4:
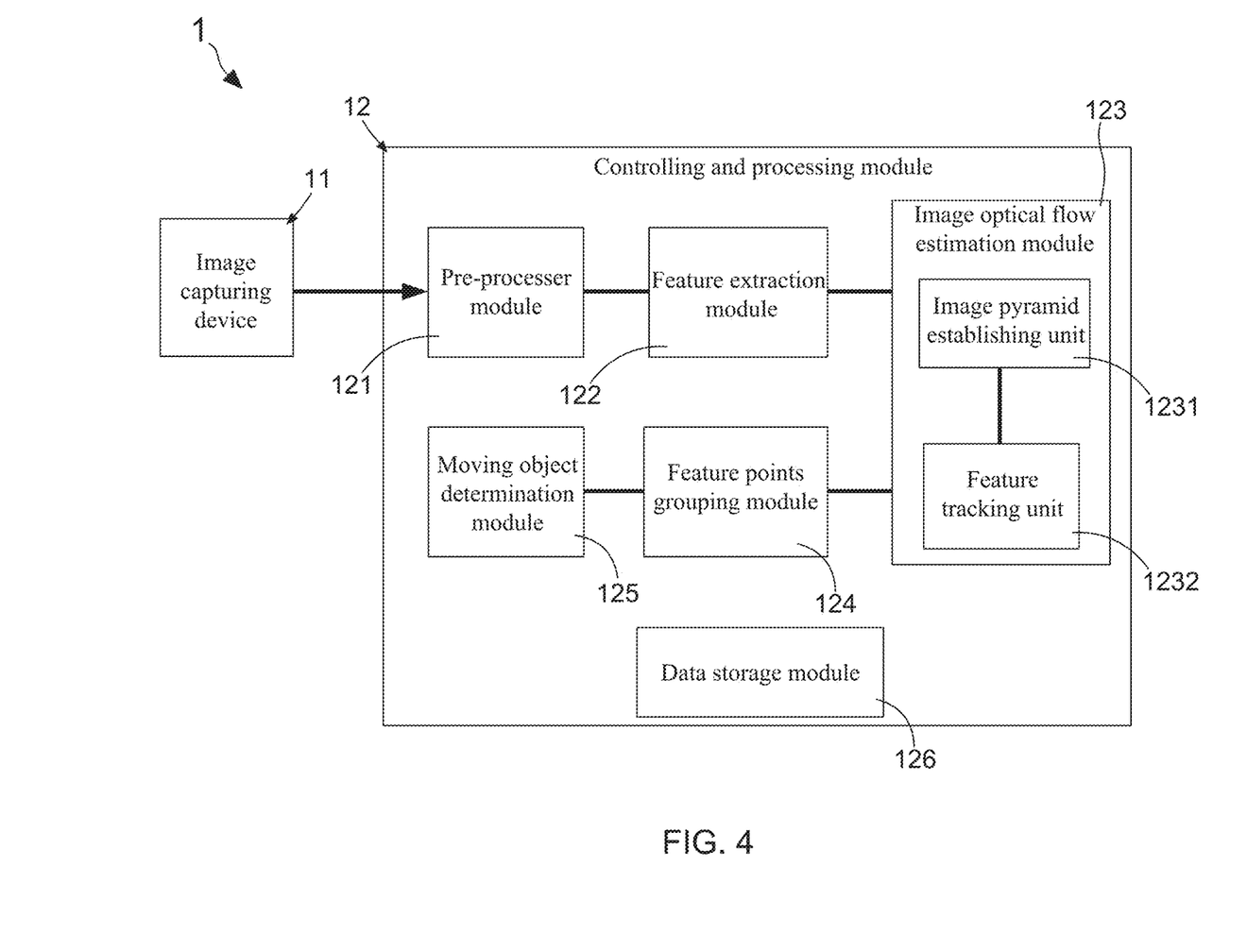
FIG. 4 shows a functional block diagram of a controlling and processing device.

FIG. 3 shows a framework diagram of a moving object detection system according to the present invention. As FIG. 3 shows, the moving object detection system 1 of the present invention mainly comprises an image capturing device 11 and a controlling and processing module 12. The image capturing device 11 is connected to a camera carrying device 2, and is used for applying an image capturing process to a monitoring area having at least one object 3. On the other hand, the controlling and processing module 12 is configured for receiving a plurality of image frames with time consecutiveness from the image capturing device 11, and then achieving a motion detection of the at least one object 3 after completing image processes of the plurality of image frames. FIG. 4 shows a functional block diagram of the controlling and processing device. From FIG. 4, it is understood that the controlling and processing device 12 is particularly designed to comprise a pre-processor module 121, a feature extraction module 122, an image optical flow estimation module 123, a feature points grouping module 124, and a moving object determination module 125. Computer engineers skilled in moving object detection technologies should know that, each of the pre-processor module 121, the feature extraction module 122, the image optical flow estimation module 123, the feature points grouping module 124, and the moving object determination module 125 can be provided in the controlling and processing module 12 by a form of application program, library, variables, or operands.

In procedure of completing image processes of the plurality of image frames, the pre-processer module 121 of the controlling and processing module 12 is firstly adopted for applying a background subtraction process to the plurality of image frames received from the image capturing device 11. It is worth noting that, the plurality of image frames comprises a plurality of image frame pairs, and each of the plurality of image frame pairs consists of a previous-time image frame and a current-time image frame. The previous-time image frame and the said current-time image frame can be respectively an image frame captured at time point "t−1" and an image frame captured at time point "t", and can also be respectively an image frame captured at time point "t" and an image frame captured at time point "t+1". Therefore, the feature extraction module 122 in the controlling and processing device 12 is subsequently configured for apply a feature extraction process to the plurality of image frames after the background subtraction process is completed. As a result, a plurality of corner feature points are obtained from each the image frame.

Figure 5:
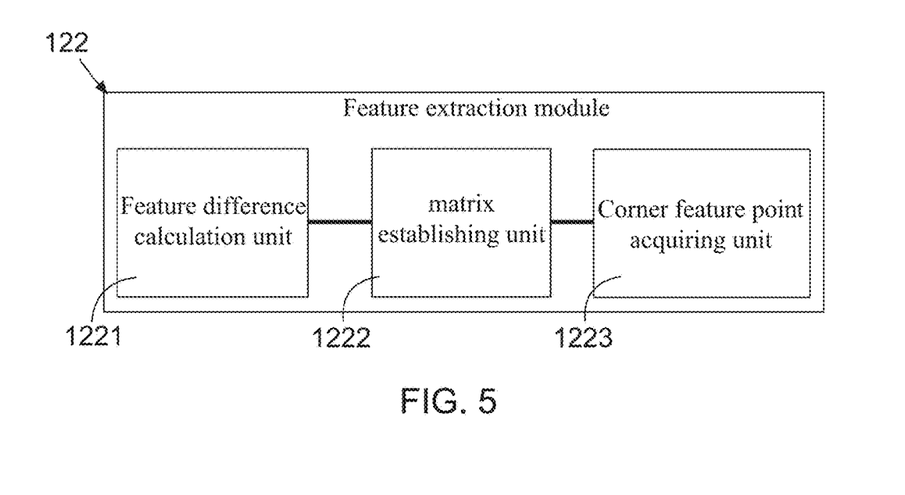
FIG. 5 shows a functional block diagram of a feature extraction module.

Referring to FIG. 3 and FIG. 4 again, and please simultaneously refer to FIG. 5 showing a functional block diagram of a feature extraction module. FIG. 5 depicts that the feature extraction module 122 comprises a feature difference calculation unit 1221, a matrix establishing unit 1222 and a corner feature point acquiring unit 1223. To find out the corner feature points from the plurality of image frames, the feature extraction module 122 firstly uses the feature difference calculation unit 1221 to apply a patch-based feature difference calculating process to the plurality of image frames. Particularly, the feature difference calculation unit 1221 is provided with a feature difference calculation algorithm therein for achieving the patch-based feature difference calculating process, wherein the feature difference calculation algorithm can be mean absolute differences (MAD) algorithm, sum of absolute differences (SAD) algorithm, sum of squared differences (SSD) algorithm, or scale-invariant feature transform (SIFT) algorithm. For instance, the SAD algorithm, presented by following mathematic equation (1), is embedded in the feature difference calculation unit 1221.

$$S(x,y)=\Sigma_u\Sigma_v w(u,v)(I(u+x,v+y)-I(u,v))^2 \quad (1)$$

Subsequently, the matrix establishing unit 1222 provided in the feature extraction module 122 uses following mathematic equations (2)-(3) to establish a plurality of structure tensor matrices based on a plurality of feature difference calculation data provided by the feature difference calculation unit 1221.

$$S(x, y) = [x\ y]A\begin{bmatrix}x\\y\end{bmatrix} \quad (2)$$

$$A = \sum_u \sum_v w(u, v)\begin{bmatrix}I_x(u, v)^2 & I_x(u, v)I_y(u, v)\\I_x(u, v)I_y(u, v) & I_y(u, v)^2\end{bmatrix} \quad (3)$$

$$R = \det(A) - k \times \operatorname{trace}(A) \quad (4)$$

In the eventual stage of the feature extraction process, a corner feature point acquiring unit 1223 in the feature extraction module 122 is adopted to apply a feature value converting process to the plurality of structure tensor matrices (A). After completing the feature value converting process, following mathematic equation (4) is subsequently adopted for calculating corresponding R values of each of the feature points. Next, specific corner feature points verifying approach for closing the corner feature points is designed as the content showing in following Table (1). In addition, variables, parameters and/or notations used in above-presented mathematic equations (1)-(4) are summarized and listed in following Table (2).

TABLE 1

| Verification approach | Feature point verification result |
|---|---|
| R is small | Feature point in flat region |
| R is greater than a pre-defined threshold value | Feature point in edge |
| R is greater than a pre-defined threshold value, and is a local maximum value in the patch | Feature point in corner |

TABLE 2

| Variable, parameter or notation | Description |
|---|---|
| S(x, y) | Sum of absolute differences (SAD) |
| I(u, v) | Feature point (pixel value) |
| I(u + x, v + y) | Feature point (pixel value) has moved by (x, y) in the patch |
| w (u, v) | Weight value for the feature point (pixel value) |
| A | Structure tensor matrix |
| det(A) | Determinant of A |
| trace(A) | Trace of A |
| $I_x(u, v)$ | Partial derivative of feature point (pixel) in patch with respect to x coordinate |
| $I_y(u, v)$ | Partial derivative of feature point (pixel) in patch with respect to y coordinate |
| R | Calculation result (or value) of mathematic equation (4) |
| k | Tunable sensitivity parameter |

Figure 6:
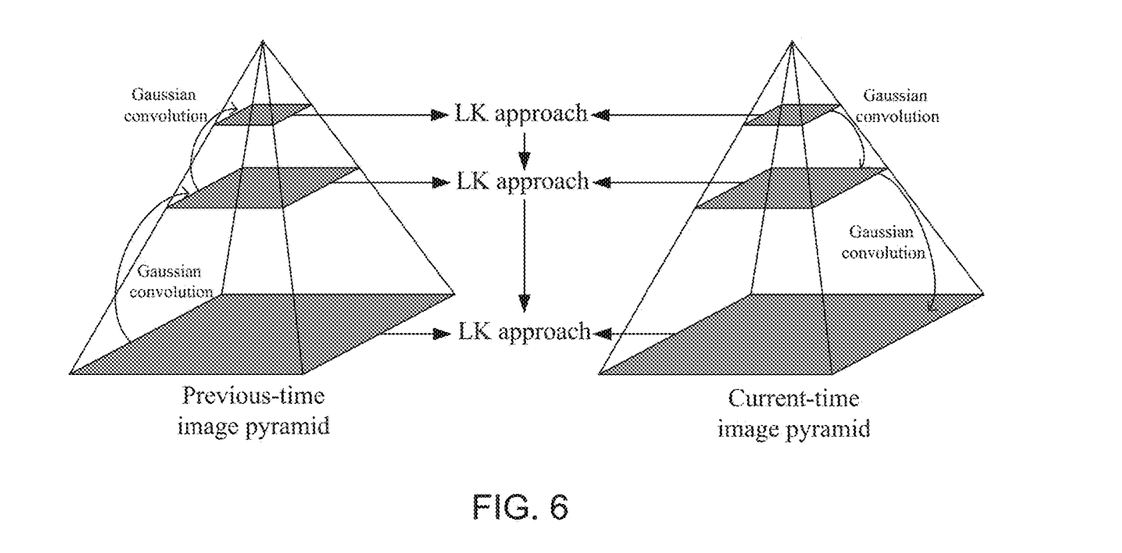
FIG. 6 shows a schematic diagram of one image pyramid pair.

After acquiring the plurality of corner feature points, the image optical flow estimation module 123 in the controlling and processing module 12 is subsequently utilized to establish a plurality of image pyramid pairs based on the plurality of image frame pairs after the feature extraction process is completed, and then apply an optical flow calculation process to the plurality of corner feature points contained in each of the plurality of image pyramid pairs. FIG. 6 shows a schematic diagram of one image pyramid pair. According to the particular design of the present invention, the image optical flow estimation module 123 comprises an image pyramid establishing unit 1231 and a feature tracking unit 1232, wherein the image pyramid establishing unit 1231 is configured for applying at least two times of Gaussian convolution processes to each of the plurality of image frame pairs for generating the plurality of image pyramid pairs.

As FIG. 6 shows, the previous-time image is treated with two-times of Gaussian upsampling convolution processes, such that three levels of images constitute a previous-time image pyramid. Moreover, the current-time image is applied with two-times of Gaussian downsampling convolution processes in order to generate a current-time image pyramid formed by three levels of images. Therefore, the feature tracking unit 1232 in the image optical flow estimation module 123 is adopted for using Lucas-Kanade (LK) optical flow approach to complete the optical flow calculation process of the previous-time image pyramid and the current-time image pyramid. However, owing to the fact that the calculated optical flow value of each of the plurality of corner feature points may be nonlinear, linear interpolation should be utilized for achieving a liner correction on the optical flow value of each of the plurality of corner feature points contained in the image pyramid pairs.

After the optical flow calculation process is completed, the feature points grouping module 124 in the controlling and processing device 12 is used for applying a cluster labeling process to the plurality of corner feature points contained in each of the plurality of image pyramid pairs, so as to obtain a plurality of corner feature point groups. For instance, a feature point (pixel value) in a patch would be verified as a corner feature point P in the case of the fact that R is greater than a pre-defined threshold value and is also a local maximum value in the patch. Subsequently, the feature points grouping module 124 would determine whether the number of feature points in a pre-defined radius from the corner feature point P is smaller than a minimum threshold value or not. If yes, those feature points are clustered to an identical corner feature point group by the feature points grouping module 124. After the plurality of corner feature point groups are obtained, the moving object determination module 125 is configured to achieve a motion detection of the at least one object 3 by determining whether the plurality of corner feature point groups move or not.

In the present invention, the moving object determination module 125 is provided with a motion vector calculation algorithm therein for achieving the motion detection of the at least one object 3, and the motion vector calculation algorithm is selected from the group consisting of least squares estimation algorithm, minimum least squares estimation algorithm, and damped least square estimation algorithm. For instance, the minimum least squares estimation algorithm, presented by following two mathematic equations, is embedded in the moving object determination module 125. In addition, variables, parameters and/or notations used in the following two mathematic equations are summarized and listed in following Table (3).

$$I_x(x, y, t)V_x + I_y(x, y, t)V_y + I_t(x, y, t) = 0$$

$$\begin{bmatrix} V_x \\ V_y \end{bmatrix} = \begin{bmatrix} \sum_{i=1}^{n} I_x(q_i)^2 & \sum_{i=1}^{n} I_x(q_i)\,I_y(q_i) \\ \sum_{i=1}^{n} I_y(q_i)\,I_x(q_i) & \sum_{i=1}^{n} I_y(q_i)^2 \end{bmatrix} \begin{bmatrix} -\sum_{i=1}^{n} I_x(q_i)\,I_t(q_i) \\ -\sum_{i=1}^{n} I_y(q_i)\,I_t(q_i) \end{bmatrix}$$

TABLE 3

| Variable, parameter or notation | Description |
| --- | --- |
| $I_x(q_i) = I_x(x_i, y_i, t)$ | Partial derivative of corner feature point (pixel value) with respect to x |
| $I_y(q_i) = I_y(x_i, y_i, t)$ | Partial derivative of corner feature point (pixel value) with respect to y |
| $I_t(q_i) = I_t(x_i, y_i, t)$ | Partial derivative of corner feature point (pixel value) with respect to t |
| $V_x$ | Motion vector with respect to x coordinate |
| $V_y$ | Motion vector with respect to y coordinate |
| n | Positive integer |

Following on from the previous descriptions, the moving object determination module 125 is able to detect that the at least one corner feature point group is moving in the case of any one of the motion vectors being calculated to be not equal to zero. Briefly speaking, the moving object determination module 125 can achieve the motion detection of the at least one object 3 by just determining whether the corner feature point groups move or not. On the other hand, the controlling and processing device 12 is further provided with a data storage module 126 for storing the plurality of image frames, the plurality of image frames after the background subtraction process is completed, the plurality of image frames after the feature extraction process is completed, the plurality of corner feature points contained in each of the plurality of image pyramid pairs, and the plurality of corner feature point groups. It is worth particularly explaining that, the adding of the feature difference calculation unit 1221, the matrix establishing unit 1222 and the corner feature point acquiring unit 1223 in the feature extraction module 122 is helpful for largely enhancing the computing speed of the controlling and processing device 12 in verifying and choosing corner feature points from the image pyramid pairs.

Figure 7A:
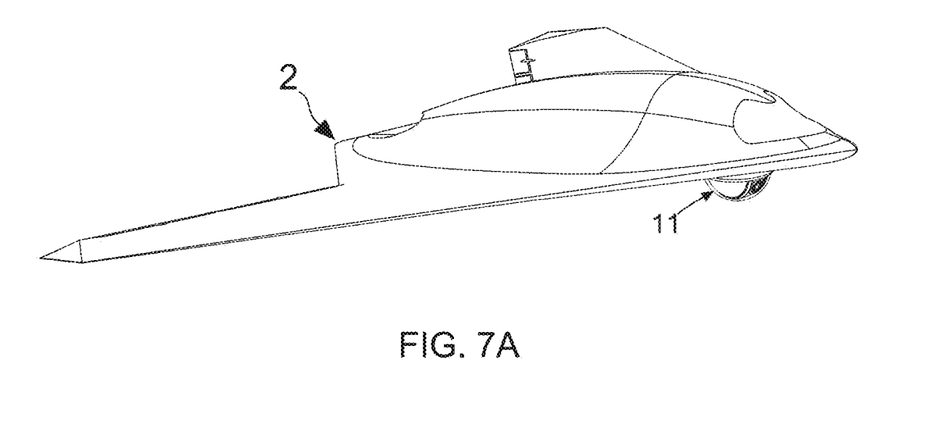
FIG. 7A shows a first schematic diagram of an exemplary application of the moving object detection system.
Figure 7B:
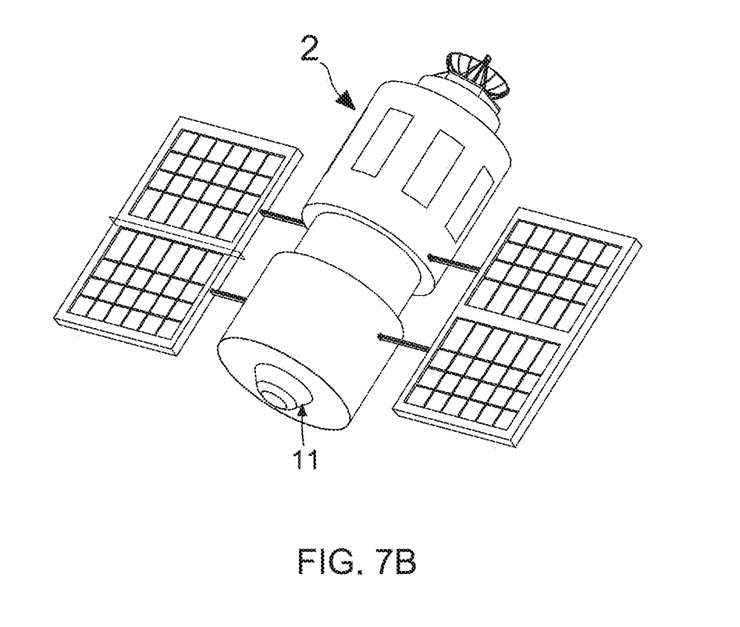
FIG. 7B shows a second schematic diagram of an exemplary application of the moving object detection system.
Figure 7C:
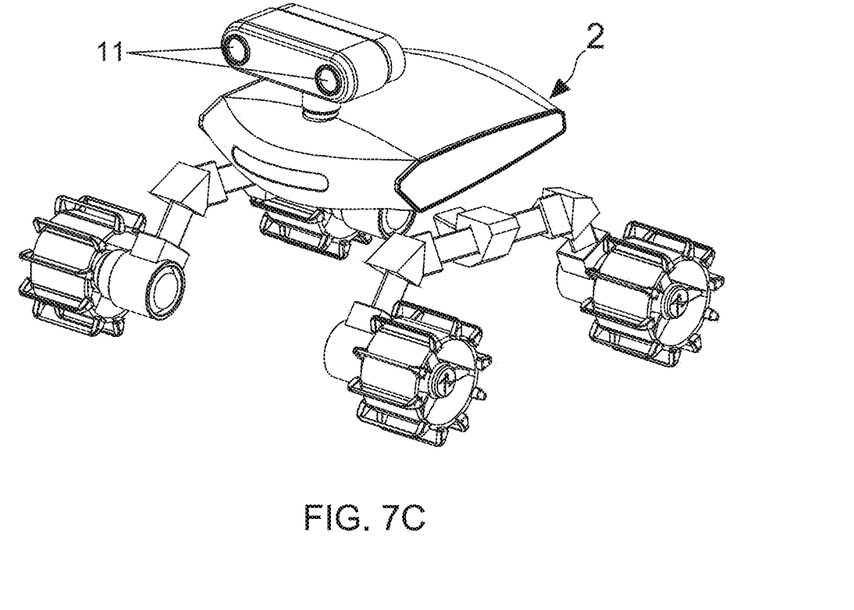
FIG. 7C shows a third schematic diagram of an exemplary application of the moving object detection system.
Figure 7D:
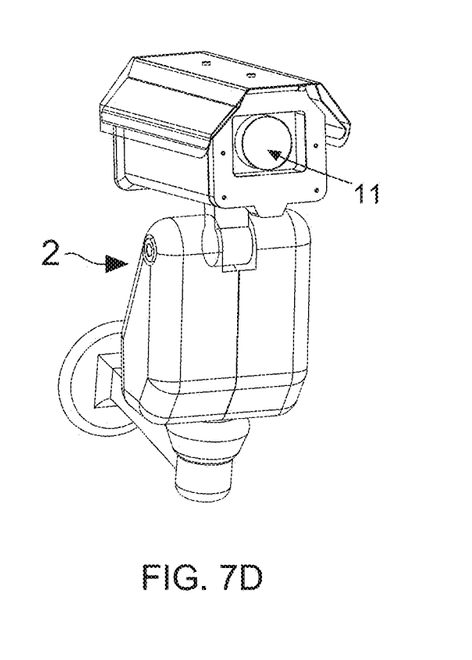
FIG. 7D shows a fourth schematic diagram of an exemplary application of the moving object detection system.

In spite of the fact that FIG. 3 depicts this moving object detection system 1 is implemented into an aerial photography drone, but that does not used for forming a practical application limitation of the moving object detection system 1. FIG. 7A, FIG. 7B, FIG. 7C, and FIG. 7D show various schematic diagrams of exemplary applications of the moving object detection system. From the illustrations shown in FIG. 7A, FIG. 7B, and FIG. 7C it is understood that this moving object detection system 1 can also be applied in an unmanned aerial vehicle (UAV), a satellite, or a robotics system for space exploration. Of course, the moving object detection system 1 can also be applied in current-popular robot cleaners. On the other hand, FIG. 7D depicts that the image capturing device 11 of the moving object detection system 1 can be a surveillance camera.

It needs to emphasize that, although FIG. 3 and FIG. 4 indicate that the moving object detection system 1 of the present invention seems having a hardware framework, that does not used for limiting the implementation type of the moving object detection system 1. Engineers skilled in moving object detection technologies should know that, both the image feature verification module and the object tracking module can also be established by using mathematical algorithms, so as to be provided in an execution device such as processor, industrial computer, server computer, desk computer, laptop computer, tablet computer, smart phone, or smart watch by a form of application program, library, variables, or operands. Accordingly, the present invention simultaneously provides a moving object detection method capable of being implemented in an execution device like the controlling and processing device 12 shown in FIG. 3.

Figure 8A:
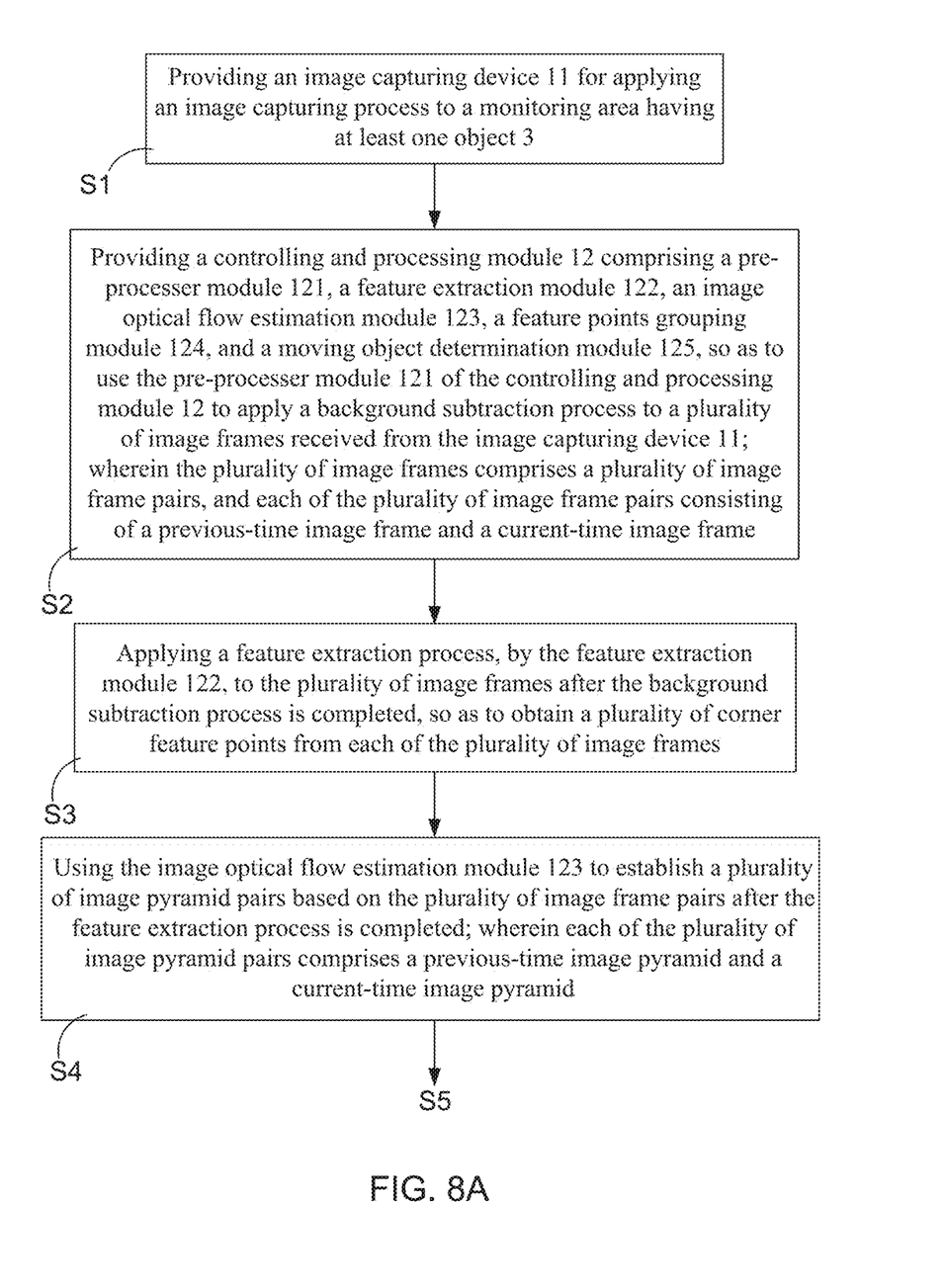
FIG. 8A and FIG. 8B show flowcharts of a moving object detection method according to the present invention.
Figure 8B:
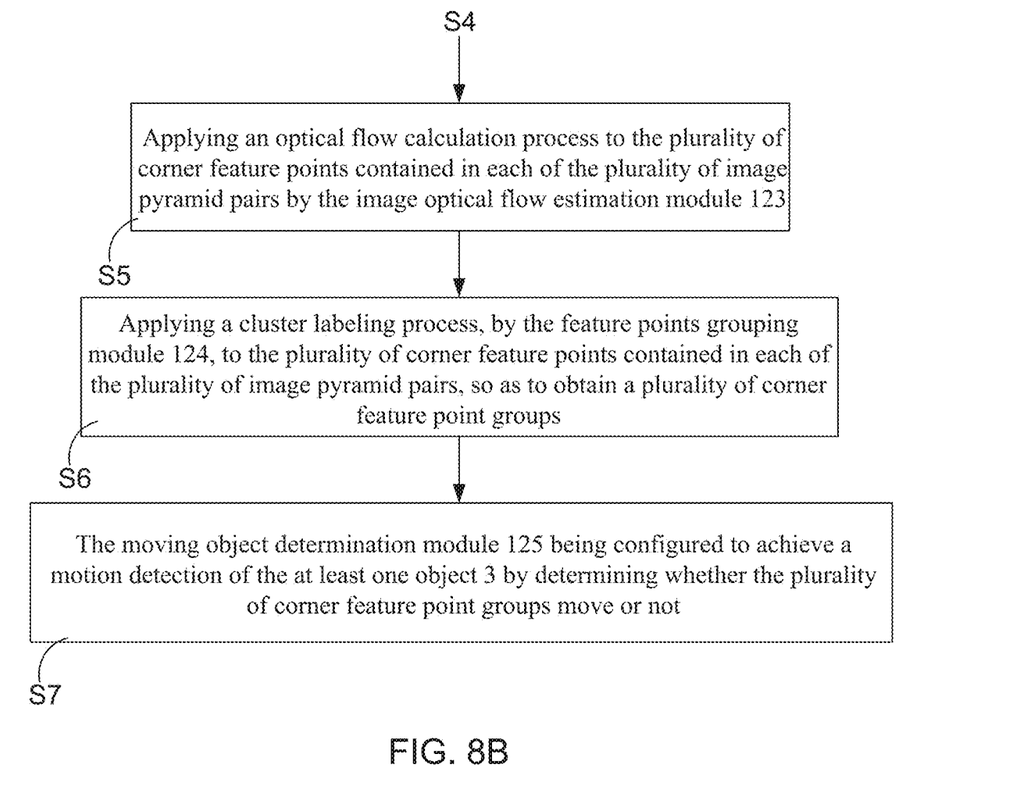

FIG. 8A and FIG. 8B show flowcharts of a moving object detection method according to the present invention. In flow procedure of the moving object detection method, with reference to FIG. 3 and FIG. 8A simultaneously, step S1 is firstly executed for providing an image capturing device 11 for applying an image capturing process to a monitoring area having at least one object 3. Next, in step S2 of the method flow, a controlling and processing module 12 comprising a pre-processer module 121, a feature extraction module 122, an image optical flow estimation module 123, a feature points grouping module 124, and a moving object determination module 125 is provided as the illustrations of FIG. 3 and FIG. 4, and then the pre-processer module 121 of the controlling and processing module 12 is utilized to apply a background subtraction process to a plurality of image frames received from the image capturing device 11. It needs to further explain that, the plurality of image frames comprises a plurality of image frame pairs, and each of the plurality of image frame pairs consists of a previous-time image frame and a current-time image frame. The said previous-time image frame and the said current-time image frame can be respectively an image frame captured at time point "t−1" and an image frame captured at time point "t", and can also be respectively an image frame captured at time point "t" and an image frame captured at time point "t+1".

Figure 9:
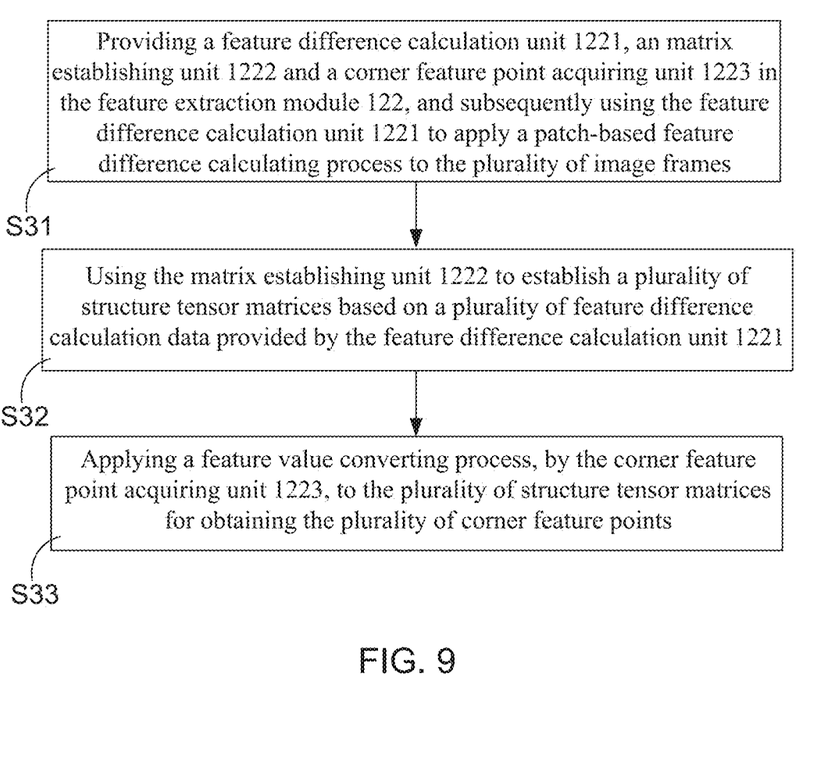
FIG. 9 shows a detail flowchart of step S3.

Subsequently, the method flow proceeds to step S3 so as to apply a feature extraction process, by the feature extraction module 122, to the plurality of image frames after the background subtraction process is completed, such that a plurality of corner feature points are obtained from each of the plurality of image frames. With reference to FIG. 5 and FIG. 9, the step S3 comprises three detail execution steps, wherein step S31 is configured for providing a feature difference calculation unit 1221, an matrix establishing unit 1222 and a corner feature point acquiring unit 1223 in the feature extraction module 122, and then using the feature difference calculation unit 1221 to apply a patch-based feature difference calculating process to the plurality of image frames. Next, step S32 is executed, such that the matrix establishing unit 1222 is adopted for establishing a plurality of structure tensor matrices based on a plurality of feature difference calculation data provided by the feature difference calculation unit 1221. In the end of the procedure of the three detail execution steps, it proceeds to step S33 for applying a feature value converting process, by the corner feature point acquiring unit 1223, to the plurality of structure tensor matrices for obtaining the plurality of corner feature points. In the present invention, above-presented mathematic equations (1)-(4) and above-mentioned specific corner feature points verifying approach are utilized to make the corner feature point acquiring unit 1223 quickly verify and choose corner feature points from the image frames.

Please refer to FIG. 3, FIG. 4, FIG. 8A, and FIG. 8B again. The method flow subsequently proceeds to step S4, so as to use the image optical flow estimation module 123 to establish a plurality of image pyramid pairs based on the plurality of image frame pairs after the feature extraction process is completed, and subsequently to; wherein each of the plurality of image pyramid pairs comprises a previous-time image pyramid and a current-time image pyramid. After that, step S5 is executed for applying an optical flow calculation process to the plurality of corner feature points contained in each of the plurality of image pyramid pairs by the image optical flow estimation module 123. As FIG. 6 shows, the previous-time image is treated with two-times of Gaussian upsampling convolution processes, such that three levels of images constitute a previous-time image pyramid. Moreover, the current-time image is applied with two-times of Gaussian downsampling convolution processes in order to generate a current-time image pyramid formed by three levels of images. After the image pyramid pairs are generated, the feature tracking unit 1232 in the image optical flow estimation module 123 is adopted for using Lucas-Kanade (LK) optical flow approach to complete the optical flow calculation process of the previous-time image pyramid and the current-time image pyramid. However, owing to the fact that the calculated optical flow value of each of the plurality of corner feature points may be nonlinear, linear interpolation should be utilized for achieving a liner correction on the optical flow value of each of the plurality of corner feature points contained in the image pyramid pairs.

After the steps S4-S5 are completed, the method flow is proceeded to step S6, such that the feature points grouping module 124 is utilized to apply a cluster labeling process to the plurality of corner feature points contained in each of the plurality of image pyramid pairs, and then a plurality of corner feature point groups are defined. For instance, a feature point (pixel value) in a patch would be verified as a corner feature point P in the case of the fact that R is greater than a pre-defined threshold value and is also a local maximum value in the patch. Subsequently, the feature points grouping module 124 would determine whether the number of feature points in a pre-defined radius from the corner feature point P is smaller than a minimum threshold value or not. If yes, those feature points are clustered to an identical corner feature point group by the feature points grouping module 124. After the plurality of corner feature point groups are obtained, the moving object determination module 125 is configured to achieve a motion detection of the at least one object 3 by determining whether the plurality of corner feature point groups move or not.

Therefore, through above descriptions, the moving object detection system and method provided by the present invention has been introduced completely and clearly; in summary, the present invention includes the advantages of:

(1) The present invention discloses a moving object detection system and method. The system comprises an image capturing device 11 and a controlling and processing module 12, wherein a pre-processer module 121, a feature extraction module 122, an image optical flow estimation module 123, a feature points grouping module 124, and a moving object determination module 125 are provided in the controlling and processing module 12 by a form of application program, library, variables, or operands. In the present invention, more particularly, a feature difference calculation unit 1221, a matrix establishing unit 1222 and a corner feature point acquiring unit 1223 are provided in the feature extraction module 122, and that is helpful for largely enhancing the computing speed of the controlling and processing device 12 in verifying and choosing corner feature points from the image frames. Therefore, after the corner feature points are applied with a cluster labeling process, the moving object determination module 125 can achieve motion detection of at least one object 3 locating in a monitoring area by just determining whether corner feature point groups move or not.

The above description is made on embodiments of the present invention. However, the embodiments are not intended to limit scope of the present invention, and all equivalent implementations or alterations within the spirit of the present invention still fall within the scope of the present invention.

What is claimed is:

1. A moving object detection system, comprising:
an image capturing device, being configured to apply an image capturing process to a monitoring area having at least one object, thereby generating a plurality of image frames with time consecutiveness; and
a controlling and processing device, being configured to perform a plurality of functions consisting of:
(a) applying a background subtraction process to the plurality of image frames;
wherein the plurality of image frames comprises a plurality of image frame pairs, and each of the plurality of image frame pairs consisting of a previous-time image frame and a current-time image frame;
(b) extracting a plurality of corner feature points from each of the plurality of image frames;
(c) establishing a plurality of image pyramid pairs based on the plurality of image frame pairs and applying an optical flow calculation process to the plurality of corner feature points contained in each of the plurality of image pyramid pairs;
(d) applying a cluster labeling process to the plurality of corner feature points contained in each of the plurality of image pyramid pairs, so as to obtain a plurality of corner feature point groups; and
(e) achieving a motion detection of the at least one object by using a motion vector calculation algorithm to determine whether the plurality of corner feature point groups move or not.

2. The moving object detection system of claim 1, wherein the controlling and processing device is selected from the group consisting of processor, industrial computer, server computer, desk computer, laptop computer, tablet computer, smart phone, and smart watch.

3. The moving object detection system of claim 1, wherein the controlling and processing device performs the forgoing function (b) through steps of:
(b1) applying a patch-based feature difference calculating process to the plurality of image frames by using a feature difference calculation algorithm that is selected from the group consisting of mean absolute differences (MAD) algorithm, sum of absolute differences (SAD) algorithm, sum of squared differences (SSD) algorithm, and scale-invariant feature transform (SIFT) algorithm, thereby generating a plurality of feature difference calculation data;
(b2) establishing a plurality of structure tensor matrices based on the plurality of feature difference calculation data; and
(b3) applying a feature value converting process to the plurality of structure tensor matrices, so as to obtain the plurality of corner feature points.

4. The moving object detection system of claim 1, wherein the controlling and processing device performs the forgoing function (c) through steps of:
(c1) applying at least two times of Gaussian convolution processes to each of the plurality of image frame pairs, so as to establish the plurality of image pyramid pairs; and
(c2) using Lucas-Kanade optical flow approach to complete the optical flow calculation process of the previous-time image pyramid and the current-time image pyramid.

5. The moving object detection system of claim 1, wherein the motion vector calculation algorithm is selected from the group consisting of least squares estimation algorithm, minimum least squares estimation algorithm, and damped least square estimation algorithm.

6. A moving object detection method, comprising following steps:
(1) providing an image capturing device for applying an image capturing process to a monitoring area having at least one object;
(2) providing a controlling and processing device comprising a pre-processer module, a feature extraction module, an image optical flow estimation module, a feature points grouping module, and a moving object determination module , so as to use the pre-processer module of the controlling and processing device to apply a background subtraction process to a plurality of image frames received from the image capturing device; wherein the plurality of image frames comprises a plurality of image frame pairs, and each of the plurality of image frame pairs consisting of a previous-time image frame and a current-time image frame;
(3) applying a feature extraction process, by the feature extraction module, to the plurality of image frames after the background subtraction process is completed, so as to obtain a plurality of corner feature points from each of the plurality of image frames;
(4) using the image optical flow estimation module to establish a plurality of image pyramid pairs based on the plurality of image frame pairs after the feature extraction process is completed; wherein each of the plurality of image pyramid pairs comprises a previous-time image pyramid and a current-time image pyramid;
(5) applying an optical flow calculation process to the plurality of corner feature points contained in each of the plurality of image pyramid pairs by the image optical flow estimation module;
(6) applying a cluster labeling process, by the feature points grouping module, to the plurality of corner feature points contained in each of the plurality of image pyramid pairs, so as to obtain a plurality of corner feature point groups; and
(7) the moving object determination module being configured to achieve a motion detection of the at least one object by determining whether the plurality of corner feature point groups move or not.

7. The moving object detection method of claim 6, wherein the image capturing device is connected to a camera carrying device, and the camera carrying device being selected from the group consisting of aerial photography drone, unmanned aerial vehicle (UAV), robotics system for space exploration, robot, and robot cleaner.

8. The moving object detection method of claim 6, wherein the controlling and processing device is selected from the group consisting of processor, industrial computer, server computer, desk computer, laptop computer, tablet computer, smart phone, and smart watch.

9. The moving object detection method of claim 6, wherein the moving object determination module is provided with a motion vector calculation algorithm therein for achieving the motion detection of the at least one object, and the motion vector calculation algorithm being selected from the group consisting of least squares estimation algorithm, minimum least squares estimation algorithm, and damped least square estimation algorithm.

10. The moving object detection method of claim 6, wherein the step (3) comprising following detail steps:

(31) providing a feature difference calculation unit, an matrix establishing unit and a corner feature point acquiring unit in the feature extraction module, and subsequently using the feature difference calculation unit to apply a patch-based feature difference calculating process to the plurality of image frames;

(32) using the matrix establishing unit to establish a plurality of structure tensor matrices based on a plurality of feature difference calculation data provided by the feature difference calculation unit; and (33) applying a feature value converting process, by the corner feature point acquiring unit, to the plurality of structure tensor matrices for obtaining the plurality of corner feature points.

11. The moving object detection method of claim 10, wherein the feature difference calculation unit is provided with a feature difference calculation algorithm therein for achieving the patch-based feature difference calculating process, and the feature difference calculation algorithm being selected from the group consisting of mean absolute differences (MAD) algorithm, sum of absolute differences (SAD) algorithm, sum of squared differences (SSD) algorithm, and scale-invariant feature transform (SIFT) algorithm.

* * * * *